United States Patent [19]

Beaman

[11] 4,314,478
[45] Feb. 9, 1982

[54] CAPACITANCE PROBE FOR HIGH RESISTANCE MATERIALS
[75] Inventor: Norman V. Beaman, La Habra, Calif.
[73] Assignee: Robertshaw Controls Company, Richmond, Va.
[21] Appl. No.: 94,869
[22] Filed: Nov. 16, 1979
[51] Int. Cl.³ .......................................... G01F 23/26
[52] U.S. Cl. ................... 73/304 C; 361/278
[58] Field of Search ............ 73/304 C; 361/278; 324/61 P

[56] References Cited

U.S. PATENT DOCUMENTS

| | | | |
|---|---|---|---|
| 2,910,940 | 11/1959 | Colman et al. | 73/304 C X |
| 2,945,165 | 7/1960 | Franzel | 73/304 C X |
| 2,955,466 | 10/1960 | Coles | 73/304 C |
| 3,037,165 | 5/1962 | Kerr | 73/304 C X |
| 3,392,349 | 7/1968 | Bartley | 73/304 C |
| 3,540,277 | 11/1970 | Roth et al. | 73/304 C X |
| 3,744,314 | 1/1971 | Lenny | 73/304 C |
| 3,934,475 | 1/1976 | Rodgers et al. | 73/304 C |
| 4,209,740 | 6/1980 | Marthe et al. | 324/61 P X |

Primary Examiner—Daniel M. Yasich
Attorney, Agent, or Firm—Fulwider, Patton, Rieber, Lee & Utecht

[57] ABSTRACT

There is disclosed a capacitance probe for determining the level of high electrical resistance material in a vessel. The probe comprises at least two parallel, large surface area blades which are supported from a mounting plate and spaced apart to define a capacitance path. One blade is attached to an insulator body which is attached to the mounting plate while the other blade is directly attached to the mounting plate in electrical continuity therewith. The insulator body is a ceramic sleeve having a length sufficient to prevent shunting of the capacitance path. The probe is particularly intended for detection of level of fly ash and the like in a receiver vessel.

6 Claims, 5 Drawing Figures

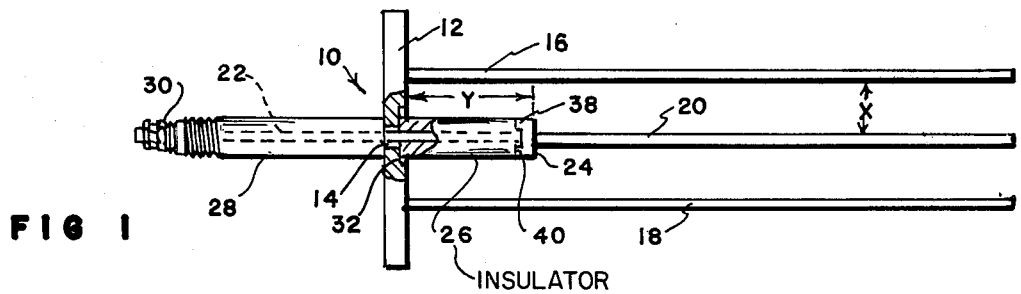
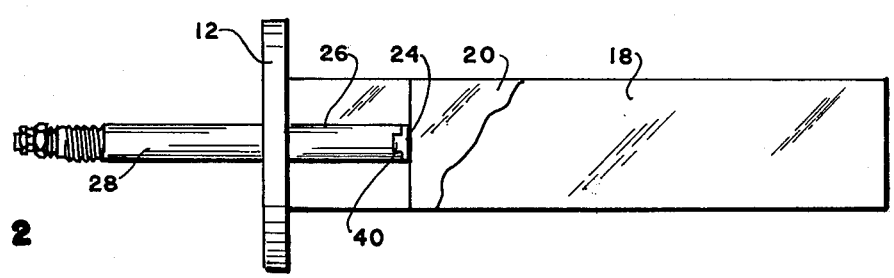
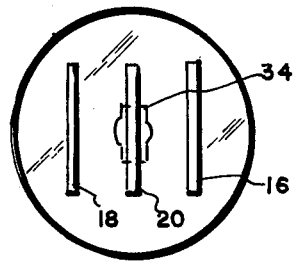
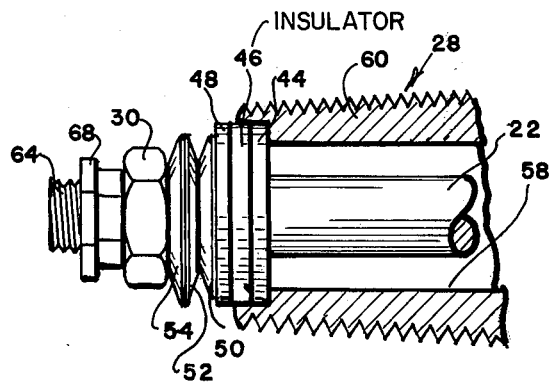
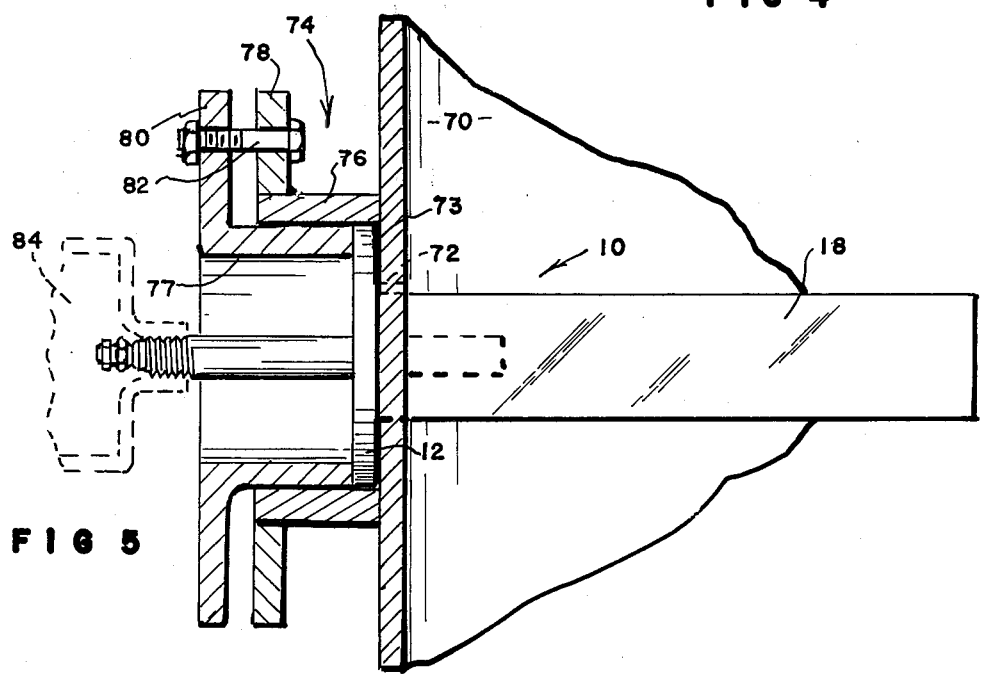

CAPACITANCE PROBE FOR HIGH RESISTANCE MATERIALS

BACKGROUND OF THE INVENTION

This invention relates to a capacitance probe for level detection and, in particular, to a capacitance probe useful for detecting the level of fly ash in a receiver vessel.

Fly ash which is precipitated from exhaust gases by Cottrell precipitators and the like is collected in receiver vessels having inlet and outlet valves to permit sequential receiving and discharging operations in response to the level of solids collected in the vessels. Fly ash has a low dielectric constant and readily coats capacitance probes and other level detectors, and thus presents a difficult application for capacitance level measurement.

One attempt to provide a stable and sensitive capacitance level detector is that shown in U.S. Pat. No. 3,934,475. The capacitance probe described and claimed in this patent avoids direct contact of the probe and fly ash by location of a capacitance plate on the outside of an insulating window in the sidewall of the vessel. This capacitance level sensor generally lacks sensitivity and stability because of filming or coating of the insulating window with the fly ash.

BRIEF DESCRIPTION OF THE INVENTION

This invention comprises a capacitance probe assembly for detection of the level of material such as fly ash in a receiving vessel. The capacitance probe comprises a mounting plate dimensioned to fit in a receptacle mounted on an external wall of the vessel in surrounding relation to a wall aperture through which the probe assembly extends into the vessel. The probe assembly has at least two, parallel, large surface blades. One of the blades is a ground blade supported directly from and in electrical continuity with the mounting plate. The other is a sensing blade supported from the mounting plate by a ceramic electrical insulator sleeve at a distance sufficient to provide a high electrical resistance to possible electrical shunting through solids collecting on the sleeve. The assembly of the sensing blade, insulator sleeve and mounting plate is secured by a threaded rod attached to the sensing blade and extending coaxially through the ceramic insulating sleeve, through an aperture in the mounting plate and through a cylindrical boss forming a part of the exterior receptacle. The assembly is secured by a retaining nut acting against stacked conical washers to place the assembly in tension. Electrical terminals are provided for connecting conducting leads to the respective sensing and ground blades. In the preferred embodiment, a pair of ground blades, each electrically grounded and attached to the mounting plate, are disposed on opposite sides of the sensing blade.

BRIEF DESCRIPTION OF THE DRAWINGS

The invention will be described with reference to the FIGURES of which:

FIG. 1 is a top view of the capacitance probe assembly;

FIG. 2 is a side elevational view of the probe assembly of FIG. 1;

FIG. 3 is an end view of the probe assembly of FIG. 1;

FIG. 4 is an enlarged sectional view of the exterior extremity of the probe assembly of FIG. 1; and FIG. 5 is a sectional, elevational view of the probe assembly mounted in a solids receiving vessel.

DESCRIPTION OF PREFERRED EMBODIMENTS

Referring now to FIG. 1, the probe assembly 10 comprises a circular member or mounting plate 12 to which are attached the inner ends of a pair of parallel, spaced apart ground blades 16 and 18. A sensing blade 20 is disposed between and parallel to the blades 16 and 18.

Blades 16, 18 and 20 are generally rectangular, and of relatively large surface area. The blades 16 and 18 are coextensive and spaced from the blade 20 distance X to define a capacitance device. Blade 20 is shorter than blades 16 and 18, being spaced from the mounting plate by a distance Y, but is otherwise coextensive with blades 16 and 18. Distance Y is no less than distance X and, preferably, is from 1.5 to about 3 times distance X.

As well known to those skilled in the art, the capacitance value of the arrangement described is a function of the presence of particular matter such as fly ash between the blade 20 and each of the ground blades 16 and 18. Use of two blades, 16 and 18, increases the available plate capacitance area and consequently the sensitivity of the probe.

Blade 20 is distally supported by a blade holder 24 which is internally threaded to receive a rod 22 which extends outwardly and coaxially through a ceramic sleeve 26 and through a central aperture 14 of plate 12.

The opposite ends of ceramic sleeve 26 have flats 32 which at one end, as shown in FIG. 3, are received within a complemental aperture 34 on the inside face of plate 10, thereby indexing sleeve 26 in a predetermined rotative position relative to mounting plate 10. The blade holder 24 has spaced-apart and parallel indexing ribs 38 and 40 which engage the flats 32 at the opposite end of the sleeve 26. In this fashion, the parallel rotation of sensing blade 20 to the blades 16 and 18 is established and maintained.

Referring now to FIG. 4, the probe assembly is retained in position by a retaining nut 30 which bears against a plurality of annular spring washers 50, 52 and 54, a metal washer 44, a ceramic insulator washer 46, and a metal washer 48. The washers 50, 52 and 54 resiliently press against the end of a cylindrical member 28 which bears against the outside face of plate 12, biasing the rod 22 outwardly. Rod 22 extends through a passageway 58 in the member 28 and through the central bore 14. It is of lesser diameter than either of these openings and is therefore out of electrical contact with plate 10 and member 28.

The outer extremity of member 28 is externally threaded and fits within a threaded aperture in an electrical enclosure 84. The threaded end 64 of rod 22 mounts a retainer nut 68, which secures an electrical conductor lead (not shown) to the rod 22. The ground lead (not shown) is attached in any suitable manner to the member 28.

Referring now to FIG. 5, the probe assembly 10 is shown installed on a solids receiving vessel 70 having an aperture 72 and an external receptacle or nozzle 74 having a cylindrical housing 76 characterized by an annular flange 78. The capacitance probe assembly 10 is mounted in the nozzle 74 with the mounting plate 12 sealed against the outside wall of the vessel with a gasket 73. The blades 16 and 18 extend into the vessel 70 through a vessel aperture 72. A clamping sleeve 77 fits within the nozzle 76 and includes an annular flange 80 which is secured to the annular nozzle flange 78 by bolts 82.

In operation, fly ash collecting between the sensing blade 20 and the ground blades 16 and 18 alters the capacitance of the probe, which is sensed by any usual and conventional capacitance unit (not shown) electrically coupled to and responsive to changes in current between the blade 20 and the ground blades 16 and 18. As will be apparent to those skilled in the art, a predetermined amount of change in capacitance can be used to initiate suitable alarms or displays to indicate the need for fly ash removal.

The invention is generally useful for level detection of any material having a high electrical resistance such as non-polar liquids, e.g., mineral oils, distillates, and granulated or powdered solids, e.g., cereal grains flour, plastics as well as fly ash.

The invention has been described with reference to the illustrated and presently preferred embodiment. It is not intended that the invention be limited to this disclosure, the invention instead being defined in accordance with the scope of the following claims:

What is claimed is:

1. A capacitance probe for location in a vessel in the path of falling, substantially electrically non-conductive particulate matter to detect collection of such particulate matter to a predetermined level in the vessel, said probe comprising:

an electrically conductive mounting member;

at least one elongated, flat sided capacitor blade, said blade being electrically grounded and cantilever mounted at one end to said member;

an elongated, flat sided capacitor sensor element arranged in parallel, confronting, spaced apart relation to said blade;

means cantilever mounting one end of said sensor element in electrically insulative relationship to said member; and mounting means operative to mount said member to said vessel and horizontally project said blade and said sensor element within said vessel at a predetermined level, with the flat sides thereof vertically oriented whereby said particulate matter can fall freely past said blade and said sensor element without collecting therebetween.

2. A capacitance probe according to claim 1 and including a second said blade located oppositely of the first recited blade and in parallel, confronting, spaced apart relation to said sensor element.

3. A capacitance probe according to claim 1 and including tensioning means coupled to said sensor element and operative to axially urge said sensor element toward said member thereby to strengthen said cantilever mounting.

4. A capacitance probe according to claim 1 wherein all of said sensor element located outwardly of said non-conductive path is free of connection to said blade.

5. A capacitance probe according to claim 1 wherein the confronting portions of said sensor element and said blade located outwardly of said non-conductive path are coextensive and rectangularly configured.

6. A capacitance probe according to claim 1 wherein all of the confronting portions of said sensor element and said blade located outwardly of said non-conductive path are electrically conductive.

* * * * *